(12) United States Patent
Kubo et al.

(10) Patent No.: US 10,804,753 B2
(45) Date of Patent: Oct. 13, 2020

(54) PERMANENT MAGNET TYPE ROTATING ELECTRIC MACHINE AND MANUFACTURING METHOD OF THE SAME

(71) Applicant: FUJI ELECTRIC CO., LTD., Kawasaki (JP)

(72) Inventors: Toshikazu Kubo, Hino (JP); Satoshi Imamori, Hino (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 284 days.

(21) Appl. No.: 15/906,425

(22) Filed: Feb. 27, 2018

(65) Prior Publication Data

US 2018/0191208 A1 Jul. 5, 2018

Related U.S. Application Data

(63) Continuation of application No. PCT/JP2016/001508, filed on Mar. 16, 2016.

(51) Int. Cl.
*H02K 1/04* (2006.01)
*H02K 1/27* (2006.01)
(Continued)

(52) U.S. Cl.
CPC .............. *H02K 1/04* (2013.01); *H02K 1/16* (2013.01); *H02K 1/276* (2013.01); *H02K 1/2766* (2013.01);
(Continued)

(58) Field of Classification Search
CPC .......... H02K 1/04; H02K 1/276; H02K 15/12; H02K 15/085; H02K 15/03; H02K 15/024; H02K 3/12; H02K 1/2766; H02K 1/16
(Continued)

(56) References Cited

U.S. PATENT DOCUMENTS 9,431,882 B2* 8/2016 Evans .................. H02K 1/02
2010/0225431 A1* 9/2010 Kadota .............. H02K 15/03
336/130
(Continued)

FOREIGN PATENT DOCUMENTS

JP 2002-136020 5/2002
JP 2011-67027 3/2011
(Continued)

OTHER PUBLICATIONS

International Search Report dated May 31, 2016 in corresponding International Patent Application No. PCT/JP2016/001508.
English Translation by WIPO of the International Preliminary Report on Patentability dated Sep. 27, 2018 for International Patent Application No. PCT/JP2016/001508, 7 pgs.

*Primary Examiner* — Tulsidas C Patel
*Assistant Examiner* — Ahmed Elnakib

(57) ABSTRACT

A rotor core (21) in a permanent magnet type rotating electric machine (1) is formed by laminating a plurality of plate materials (21A), (21B), (21C), and (21D) and includes one or a plurality of center bridges (26) formed between adjacent magnet slots (23) to couple an outer peripheral edge (24) and a core portion (25) together in one magnetic pole. Non-magnetic portions (30) are formed at a part or all of the one or the plurality of respective center bridges (26). Insulation films (32) are disposed on surfaces of parts other than regions where the non-magnetic portions (30) are formed on the plurality of respective plate materials (21A), (21B), (21C), and (21D) forming the rotor core (21).

15 Claims, 6 Drawing Sheets

(51) Int. Cl.
  *H02K 1/16* (2006.01)
  *H02K 3/12* (2006.01)
  *H02K 15/02* (2006.01)
  *H02K 15/03* (2006.01)
  *H02K 15/085* (2006.01)
  *H02K 15/12* (2006.01)
(52) U.S. Cl.
  CPC ............. *H02K 3/12* (2013.01); *H02K 15/024* (2013.01); *H02K 15/03* (2013.01); *H02K 15/085* (2013.01); *H02K 15/12* (2013.01)
(58) Field of Classification Search
  USPC .............................................. 310/45; 29/598
  See application file for complete search history.

(56) References Cited

U.S. PATENT DOCUMENTS

| | | | |
|---|---|---|---|
| 2014/0077652 A1* | 3/2014 | Yamagishi | H02K 1/28 310/156.21 |
| 2015/0270749 A1 | 9/2015 | Mochida et al. | |
| 2018/0191208 A1* | 7/2018 | Kubo | H02K 1/276 |

FOREIGN PATENT DOCUMENTS

| | | |
|---|---|---|
| JP | 2012-44809 | 3/2012 |
| JP | 2013-99050 | 5/2013 |
| WO | WO 2014/122947 A1 | 8/2014 |

* cited by examiner

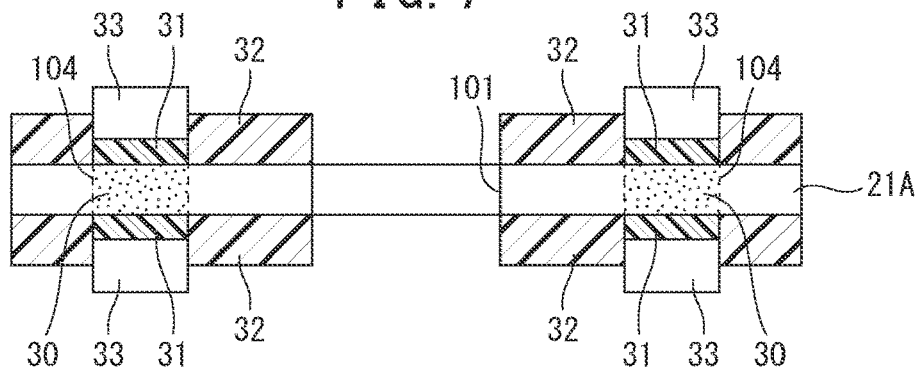
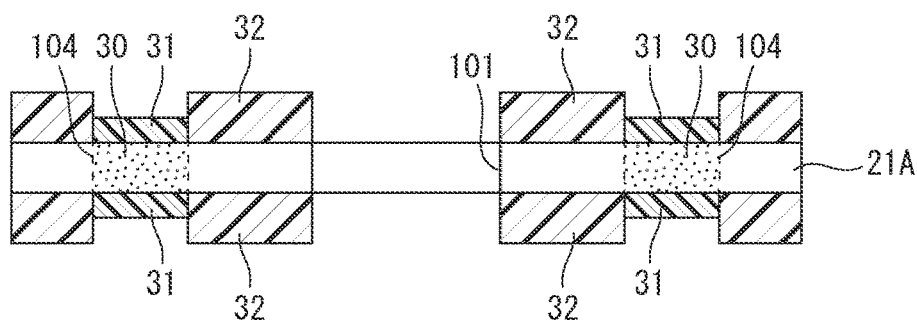
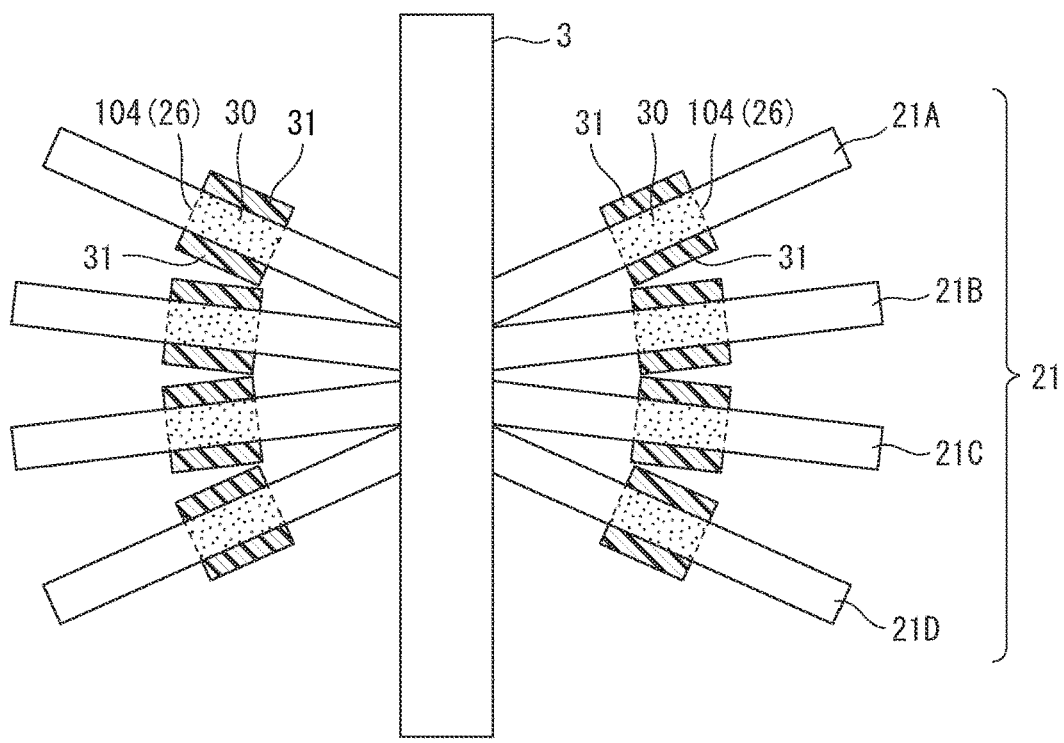

PERMANENT MAGNET TYPE ROTATING ELECTRIC MACHINE AND MANUFACTURING METHOD OF THE SAME

CROSS REFERENCE TO RELATED APPLICATIONS

This application is a continuation application, filed under 35 U.S.C. § 111(a), of International Patent Application No. PCT/JP2016/001508, filed Mar. 16, 2016, the contents of which are incorporated herein by reference.

TECHNICAL FIELD

The present invention relates to a permanent magnet type rotating electric machine and a manufacturing method of the same.

BACKGROUND ART

Compared with an induction machine or a similar machine, a permanent magnet type rotating electric machine has been known for a high torque and high efficiency and the applications recently have been expanding. Among the permanent magnet type rotating electric machines, the use of an electric motor, which is used as a main engine of an Electric Vehicle (EV) and a Hybrid Electric Vehicle (HEV), in a high speed rotation region has been increasing to obtain a large output with a small size.

The use of the permanent magnet type rotating electric machine in the high speed rotation region, for example, around 20000 rpm brings a problem of damage of a rotor first of all.

With a surface magnet type rotating electric machine, while a method of pasting a permanent magnet to a rotor core with adhesive is generally employed, only the adhesive absolutely fails to bear centrifugal force, and there is a high possibility of peeling of the permanent magnet. Therefore, a reinforcement method of winding a bind around a magnet outer periphery has been considered. However, winding the bind around the magnet outer periphery expands a magnetic circuit gap, resulting in reduction in torque.

On the other hand, with an embedded magnet type rotating electric machine, permanent magnets are disposed inside magnet slots formed inside a rotor core. Generally, in the rotor core of the embedded magnet type rotating electric machine, a plurality of magnet slots are formed in one pole and the permanent magnets are disposed in the respective magnet slots. The rotor core includes an outer peripheral edge formed outside the magnet slots and a core portion formed inside the magnet slots. The outer peripheral edges and the core portions are coupled with one or a plurality of center bridges formed between the adjacent magnet slots. In view of this, with the embedded magnet type rotating electric machine, the center bridge supports the permanent magnets disposed in the magnet slots. Accordingly, in the highspeed rotation region, the embedded magnet type rotating electric machine is appropriate more than the surface magnet type rotating electric machine.

As a conventional permanent magnet embedded type rotating electric machine of this type, for example, one described in PTL 1 has been known.

The permanent magnet embedded type rotating electric machine described in PTL 1 includes a rotor that includes a rotor core. The rotor core includes two lined-up magnet slots, an outer peripheral edge formed outside the two magnet slots, a core portion formed inside the two magnet slots, and a center bridge formed between the adjacent magnet slots to couple the outer peripheral edge and the core portion together in one magnetic pole. Permanent magnets are disposed inside a plurality of respective magnet slots of the rotor core and a shaft is fixed to the rotor core.

Here, with the permanent magnet embedded type rotating electric machine described in PTL 1, to bear strong centrifugal force generated at a large-diameter rotating electric machine rotating at a high speed, it is necessary to disperse the centrifugal force by the above-described center bridge and widen the width of the center bridge so as to have a structure of bearing the centrifugal force. Increasing the number of center bridges and widening the width results in a leakage of magnetic flux from the permanent magnet via each center bridge, thereby failing to achieve a high torque easily. That is, one object of the embedded magnet type rotating electric machine rotating at a high speed is to achieve both a reduction in magnetic flux leakage and improvement in centrifugal force resistance at each center bridge at the same time.

CITATION LIST

Patent Literature

PTL 1: WO 14/122947

SUMMARY OF INVENTION

Technical Problem

Recently, a method to non-magnetize a part or all of center bridges has been developing against the above-described problem. Thus, non-magnetizing a part or all of the center bridges reduces an amount of leakage of magnetic flux from a permanent magnet via the center bridge, ensuring easily achieving a high torque.

However, in a process of non-magnetizing a part or all of the center bridges, performing this non-magnetism by heating using laser causes a temperature of a laser irradiation unit to be about 1000 degrees and therefore oxidation of the laser irradiation unit is unavoidable. When an oxide film is produced at the non-magnetized part, surfaces of respective plate materials to form the rotor core become uneven. Accordingly, laminating these plates to form the rotor core warps a laminated material and this makes it difficult to embed the permanent magnets into the respective magnet slots. In the rotor core, for insulation between the laminated plate materials, insulation films are generally disposed on surfaces of these plate materials. However, since the surfaces of the plate materials have a plate thickness thicker at the oxide film parts, the plate thicknesses become unevenness when the insulation films are disposed at the surfaces of these plate materials. In view of this, laminating these plate materials to form the rotor core causes a problem of generating a gap between the laminated plate materials. The gap between the laminated plate materials lengthens a length in the shaft direction to obtain an output identical to the rotating electric machine having the rotor core formed by laminating the plate materials having the uniform plate thickness, causing a problem of increase in body size of the rotating electric machine.

On the other hand, when the oxide film at the non-magnetized part is attempted to be removed to solve these problems, the non-magnetized part is processed. This causes a deformation-induced martensitic generating phenomenon, develops a ferromagnetism phase at the non-magnetized part, and causes a problem of losing the feature of the non-magnetism of a part or all of the center bridges. That is, the amount of leakage of the magnetic flux from the permanent magnet via the center bridge cannot be reduced.

Accordingly, the present invention has been made to solve these conventional problems and the object is to provide a permanent magnet type rotating electric machine where plate materials with a uniform plate thickness can be laminated even with oxide films on surfaces of non-magnetic portions on the plurality of respective plate materials forming a rotor core and a manufacturing method of the permanent magnet type rotating electric machine.

Solution to Problem

A gist of a permanent magnet type rotating electric machine according to one aspect of the present invention to achieve the object is the permanent magnet type rotating electric machine that includes a stator and a rotor. The stator includes a stator core and a plurality of winding wires. The plurality of winding wires are wound around a plurality of respective teeth disposed at the stator core. The rotor is rotatably disposed opposed to the stator core at a predetermined gap. The rotor includes a rotor core, a plurality of permanent magnets, and a shaft. The rotor core is formed by laminating a plurality of plate materials. The rotor core includes a plurality of lined-up magnet slots, an outer peripheral edge, a core portion, and one or a plurality of center bridges in one magnetic pole. The outer peripheral edge is formed outside the plurality of magnet slots. The core portion is formed inside the plurality of magnet slots. The one or the plurality of center bridges are formed between the adjacent magnet slots to couple the outer peripheral edge and the core portion together. The plurality of permanent magnets are disposed inside the plurality of respective magnet slots. The shaft is fixed to the rotor core. At a part or all of the one or the plurality of respective center bridges, non-magnetic portions are formed. Insulation films are disposed on surfaces of parts other than regions where the non-magnetic portions are formed on the plurality of respective plate materials forming the rotor core.

A gist of a manufacturing method of permanent magnet type rotating electric machine according to another aspect of the present invention is the manufacturing method of permanent magnet type rotating electric machine that includes: a step of forming a stator core; a step of winding a plurality of winding wires around a plurality of respective teeth disposed at the stator core; a step of forming a rotor core by laminating a plurality of plate materials, the rotor core including a plurality of lined-up magnet slots, an outer peripheral edge, a core portion, and one or a plurality of center bridges in one magnetic pole, the outer peripheral edge being formed outside the plurality of magnet slots, the core portion being formed inside the plurality of magnet slots, the one or the plurality of center bridges being formed between the adjacent magnet slots to couple the outer peripheral edge and the core portion together; a step of fixing a shaft to the rotor core; and a step of rotatably disposing the rotor core at an inner peripheral side of the stator core. The process of forming the rotor core includes: a plate material preparing step of preparing the plurality of plate materials; a plate material processing step of forming a hole to which the shaft is fitted and holes where the plurality of magnet slots are formed on the plurality of respective plate materials; a non-magnetizing step of non-magnetizing a part or all of parts corresponding to the center bridges of the plurality of respective plate materials to form non-magnetic portions; an insulation film forming step of forming insulation films on surfaces of parts other than regions where the non-magnetic portions are formed on the plurality of respective plate materials; and a plate material laminating step of laminating and fixing the plurality of plate materials such that the hole to which the shaft is fitted and the holes where the plurality of magnet slots are formed to be aligned in a laminating direction.

Advantageous Effects of Invention

A permanent magnet type rotating electric machine and a manufacturing method of the permanent magnet type rotating electric machine according to the present invention can provide a permanent magnet type rotating electric machine where plate materials with a uniform plate thickness can be laminated even with oxide films on surfaces of non-magnetic portions of the plurality of respective plate materials forming a rotor core and a manufacturing method of the permanent magnet type rotating electric machine.

BRIEF DESCRIPTION OF DRAWINGS

FIG. 3A illustrates the plan view, and FIG. 3B is the cross-sectional view taken along a line 3B-3B in FIG. 3A;

FIG. 4A is the plan view, and FIG. 4B is the cross-sectional view taken along a line 4B-4B in FIG. 4A;

FIG. 5A is the plan view, and FIG. 5B is the cross-sectional view taken along a line 5B-5B in FIG. 5A;

FIG. 7 is a cross-sectional view illustrating a state of applying application liquid to the plate material illustrated in FIG. 6 on which the hard masks are installed and hardening the application liquid;

FIG. 8 is a cross-sectional view illustrating a state of removing the hard masks from the state illustrated in FIG. 7;

FIG. 9 is a drawing to describe a problem of a permanent magnet type rotating electric machine according to a reference example.

DESCRIPTION OF EMBODIMENTS

Embodiments of the present invention will now be described with reference to the drawings.

Figure 1:
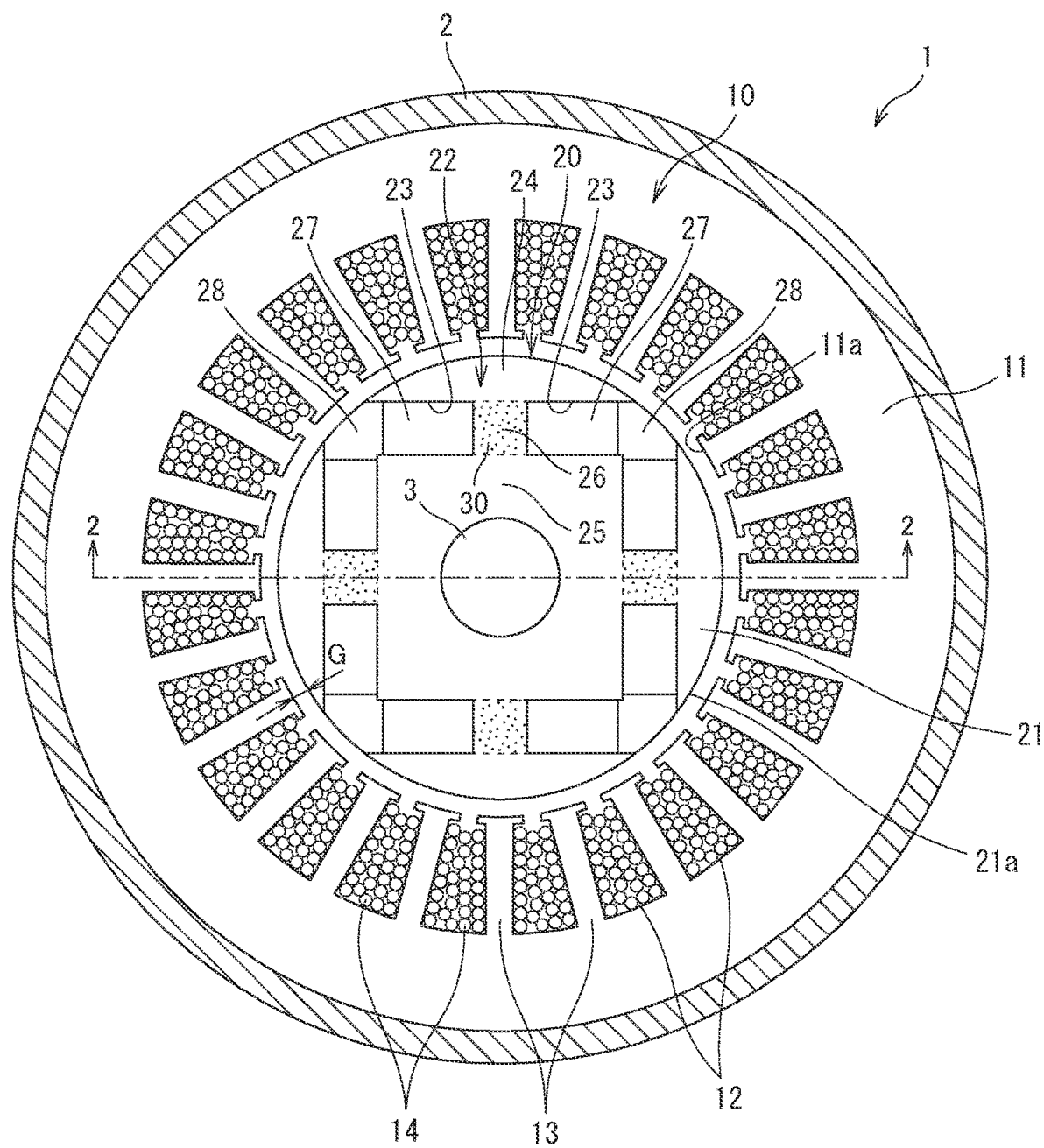
FIG. 1 is a cross-sectional view illustrating a schematic configuration of a permanent magnet type rotating electric machine according to one embodiment of the present invention.

FIG. 1 illustrates a permanent magnet type rotating electric machine according to one embodiment of the present invention. A permanent magnet type rotating electric machine 1 is an embedded magnet type synchronous motor with four poles and 24 slots. The present invention is not restricted by the number of magnetic poles, the number of slots, dimensions of other respective parts, and a similar specification by any means.

As illustrated in FIG. 1, the permanent magnet type rotating electric machine 1 includes a stator 10 and a rotor 20, which is rotatably disposed opposed to an inner peripheral side of this stator 10 with an interval of a predetermined gap G.

Here, the stator 10 includes a cylindrical-shaped frame 2 and a cylindrical-shaped stator core 11 where an inner peripheral surface 11a disposed at the inner peripheral side of the frame 2 is formed into a cylindrical shape. At the inner peripheral surface 11a side of the stator core 11, 24 pieces of slots 12 and 24 pieces of teeth 13, which are formed at regular intervals in a circumferential direction, are formed. Winding wires 14 wound around the insides of the slots 12 are wound around the respective teeth 13.

Additionally, the rotor 20 includes a cylindrical-shaped rotor core 21 formed by laminating laminated iron cores, namely, a plurality of (four sheets in the embodiment) plate materials 21A, 21B, 21C, and 21D (see FIG. 2) and having a cylindrical-shaped outer peripheral surface 21a. The rotor core 21 includes four magnetic poles 22 disposed at regular intervals in the circumferential direction. The rotor 20 is rotated by a shaft 3 fixed by fitting and insertion at the center of the rotor core 21.

As illustrated in FIG. 1, in the rotor core 21, the one magnetic pole 22 includes two magnet slots 23, an outer peripheral edge 24 formed outside the two magnet slots 23, a core portion 25 disposed inside the two magnet slots 23, and one center bridge 26 formed between the adjacent magnet slots 23 to couple the outer peripheral edge 24 and the core portion 25 together. The two magnet slots 23 are lined up such that a center line of the two magnet slots 23 in a width direction becomes perpendicular to a line connecting the center between the two magnet slots 23 and the center of the rotor core 21 (the core portion 25). The respective magnet slots 23 are formed of approximately rectangular-shaped through-holes passing through up to both ends of the rotor core 21 in the axial direction.

Rectangular-parallelepiped-shaped permanent magnets 27 are disposed and fixed to the insides of the respective magnet slots 23. Therefore, the one magnetic pole 22 includes the two permanent magnets 27 lined up by the above-described disposing configuration of the two magnet slots 23. The magnetic poles of these two permanent magnets 27 are disposed so as to be different from the magnetic poles of the permanent magnets 27 at the adjacent magnetic poles 22.

In the rotor core 21, two communication passages 28 causing the two endmost respective magnet slots 23 (only the two magnet slots in this embodiment) to communicate with the outer peripheral surface 21a of the rotor core 21 are formed. The respective communication passages 28 pass through up to both ends of the rotor core 21 in the axial direction.

Here, non-magnetic portions 30 are formed at a part or all (all in this embodiment) of the center bridge 26.

Thus, forming the non-magnetic portions 30 at a part or all of the center bridge 26 reduces an amount of leakage of magnetic flux from the permanent magnet 27 via the center bridge 26 and can easily achieve a high torque.

Here, the meaning of "non-magnetic" specifying the non-magnetic portion is meaning including all of paramagnetism, diamagnetism, and antiferromagnetism, and is meaning including a so-called feeble magnetism.

Figure 2:
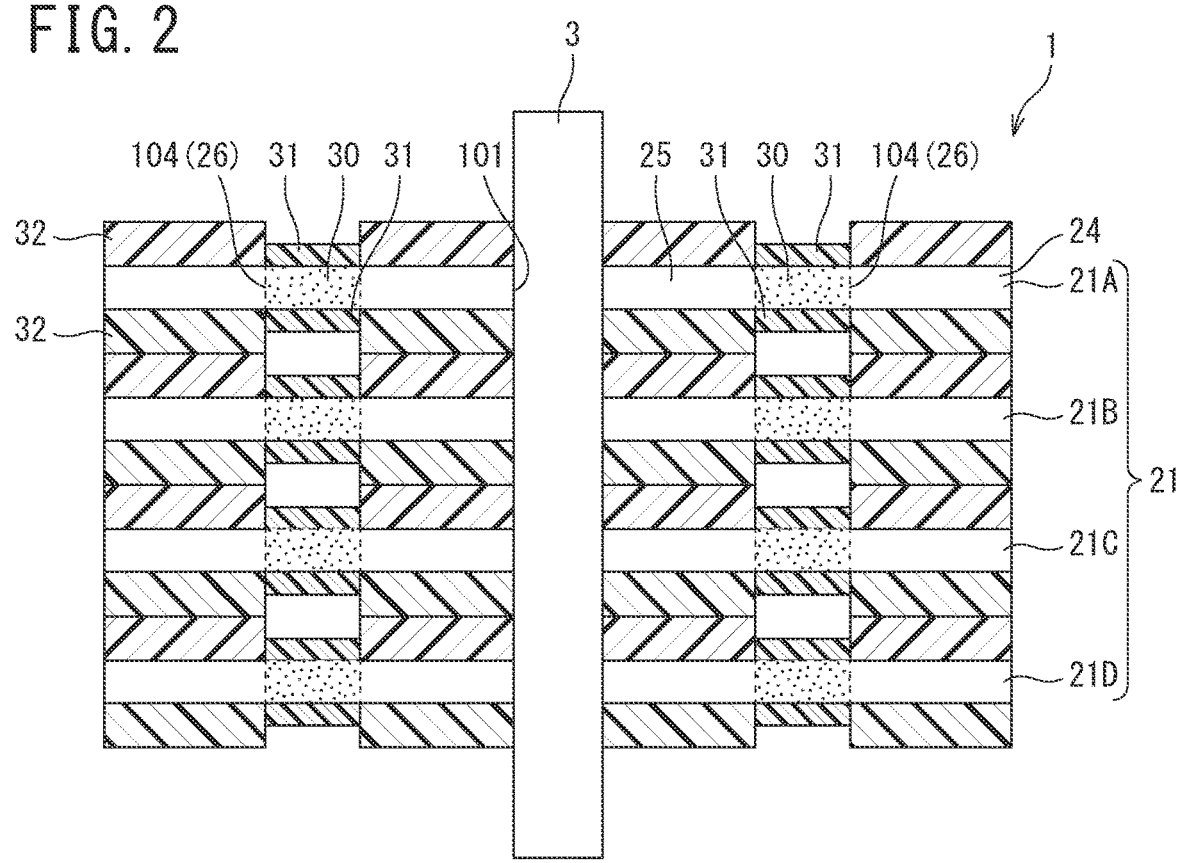
FIG. 2 is a cross-sectional view taken along a line 2-2 in FIG. 1.

In a process of non-magnetizing a part or all of the center bridge 26, as described later, performing this non-magnetism by heating using laser causes a temperature of a laser irradiation unit to be about 1000 degrees and therefore oxidation of the laser irradiation unit is unavoidable. Accordingly, as illustrated in FIG. 2, oxide films 31 are formed on front surfaces and back surfaces of the non-magnetic portions 30 on the respective plate materials 21A, 21B, 21C, and 21D forming the rotor core 21. When the oxide films 31 are formed at the front surfaces and the and back surfaces of the non-magnetic portions 30, the front surfaces and the back surfaces of the respective plate materials 21A, 21B, 21C, and 21D to form the rotor core 21 become uneven. Accordingly, laminating these plate materials 21A, 21B, 21C, and 21D to form the rotor core 21 warps a laminated material and this makes it difficult to embed the permanent magnets 27 into the respective magnet slots 23.

In the rotor core 21, for insulation between the laminated plate materials 21A, 21B, 21C, and 21D, insulation films are generally disposed on front surfaces and back surfaces of these plate materials 21A, 21B, 21C, and 21D. However, since the front surfaces and the back surfaces of the plate materials 21A, 21B, 21C, and 21D have a plate thickness thicker at the oxide film 31 parts, the plate thicknesses become unevenness when the insulation films are disposed at the front surfaces and the back surfaces of these plate materials 21A, 21B, 21C, and 21D. In view of this, laminating these plate materials 21A, 21B, 21C, and 21D to form the rotor core 21 causes a problem of generating a gap between the laminated plate materials 21A, 21B, 21C, and 21D.

To avoid such problem, as illustrated in FIG. 2, the permanent magnet type rotating electric machine 1 according to this embodiment includes insulation films 32 at front surfaces and the back surfaces of parts other than regions where the non-magnetic portions 30 are formed on the plurality of respective plate materials 21A, 21B, 21C, and 21D to form the rotor core 21.

Thus, including the insulation films 32 at the front surfaces and the back surfaces of the parts other than the regions where the non-magnetic portions 30 are formed on the plurality of respective plate materials 21A, 21B, 21C, and 21D to form the rotor core 21 causes the respective plate thicknesses of the plurality of plate materials 21A, 21B, 21C, and 21D forming the rotor core 21 to be almost uniform. This ensures configuring the permanent magnet type rotating electric machine 1 where the plate materials 21A, 21B, 21C, and 21D with a uniform plate thickness can be laminated even with the oxide films 31 on the front surfaces and the back surfaces of the non-magnetic portions 30 on the plurality of respective plate materials 21A, 21B, 21C, and 21D forming the rotor core 21. This allows avoiding the possibility of the gap between the laminated plate materials 21A, 21B, 21C, and 21D and also allows avoiding a problem of increase in body size of the permanent magnet type rotating electric machine 1.

While the thickness of the insulation film 32 is not especially specified, the thickness is preferably thicker than the thickness of the oxide film 31 and thinner as much as possible. The insulation film 32 with the thin thickness can shorten the length of the permanent magnet type rotating electric machine 1 in the shaft 3 extending direction. The insulation film 32 of this embodiment has the thickness of about 8 μm.

Here, the insulation film 32 is made of an organic material, an inorganic material, or a mixture of these materials.

Including the insulation films 32 at front surfaces and the back surfaces of the parts other than the regions where the non-magnetic portions 30 are formed on the plurality of respective plate materials 21A, 21B, 21C, and 21D to form the rotor core 21 ensures appropriate insulation between the adjacent plate materials 21A, 21B, 21C, and 21D.

The following describes a manufacturing method of the permanent magnet type rotating electric machine 1 according to the embodiment illustrated in FIGS. 1 and 2.

To manufacture the permanent magnet type rotating electric machine 1, the stator 10 is manufactured first.

The manufacturing step of the stator 10 includes a process of forming the cylindrical-shaped stator core 11 with the inner peripheral surface 11a formed into a cylindrical shape (a stator core forming step) and a process of winding the plurality of winding wires 14 around the plurality of respective teeth 13 disposed at the stator core 11 (a winding wire winding step).

Here, the stator core forming step performs presswork on plate materials made of a soft magnetic material into a predetermined two-dimensional shape having parts forming the plurality of teeth 13 to punch the plate materials, laminates the plate materials by the number of required sheets, and fixes the plate materials in the laminating direction by caulking and welding. This forms the stator core 11. An example of the plate material made of the soft magnetic material includes a non-oriented magnetic steel sheet. For formation of the stator core 11, a soft magnetic ferrite material may be pressed into a predetermined three-dimensional shape and sintered.

The winding wire winding step prepares a material of the winding wires 14 that has a conductive property and whose surfaces are insulated. For example, as the material of the winding wires 14, a generally-used magnet wire is preferable. With the case of 24 slots illustrated in FIG. 1, a distributed winding method is used as the wire winding method for the winding wires 14.

After the winding wire winding step, the stator core 11 is fixed with the frame 2. The stator 10 is thus manufactured.

Next, the rotor 20 is manufactured.

The manufacturing step of the rotor 20 includes a step of forming the rotor core 21 (a rotor core forming step) and a step of fixing the shaft 3 to the rotor core 21 (a shaft fixing step).

The rotor core forming step forms the rotor core 21 by laminating the plurality of plate materials 21A, 21B, 21C, and 21D. The rotor core 21 includes, in the one magnetic pole 22, the two lined-up magnet slots 23, the outer peripheral edge 24 formed outside the two magnet slots 23, the core portion 25 formed inside the two magnet slots 23, the one center bridge 26 formed between the adjacent magnet slots 23 to couple the outer peripheral edge 24 and the core portion 25 together, and the two communication passages 28 causing the two endmost respective magnet slots 23 to communicate with the outer peripheral surface 21a of the rotor core 21.

Figure 3A:
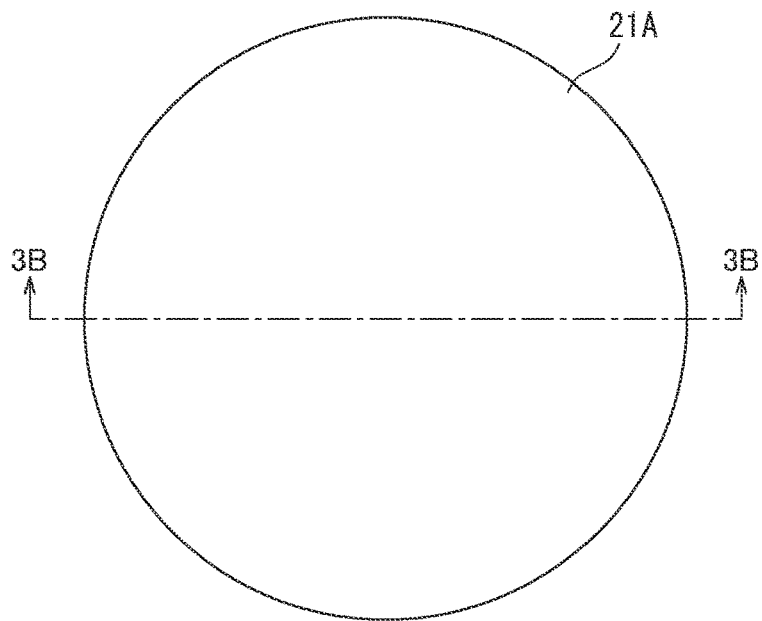
FIGS. 3A and 3B illustrate a plate material forming a rotor core.
Figure 3B:

This rotor core forming step includes a step of preparing the plurality of plate materials 21A, 21B, 21C, and 21D (a plate material preparing step). This plate material preparing step prepares the plurality of plate materials 21A, 21B, 21C, and 21D illustrated in FIGS. 3A and 3B (FIG. 3 illustrates only the plate material 21A) made of a martensitic stainless steel material as the material of the rotor core 21. The use of a silicon steel plate as the material of the plate material is also possible in addition to the martensitic stainless steel material. Note that the use of the silicon steel plate requires the use of a modified substance for a non-magnetism process. From the aspect of reduction in eddy-current loss, the plate material preferably has the plate thickness thinned to around 0.35 mm to 0.85 mm. Since an oxidation layer is present on the surface, the stainless steel material is insulated to some extent between the plates. Meanwhile, insulation coating with an inorganic or organic matter may be performed on the surface to surely reduce the eddy-current loss. The use of the martensitic stainless steel material in an annealing state where the martensitic stainless steel material has a structure of carbides dispersing in a ferrite phase brings a comparatively high soft magnetic property, and this can contribute to the high torque of the rotating electric machine. As illustrated in FIG. 3A, this plate material preparing step prepares the respective plate materials 21A, 21B, 21C, and 21D whose outer shapes are processed into a circular shape.

Figure 4A:
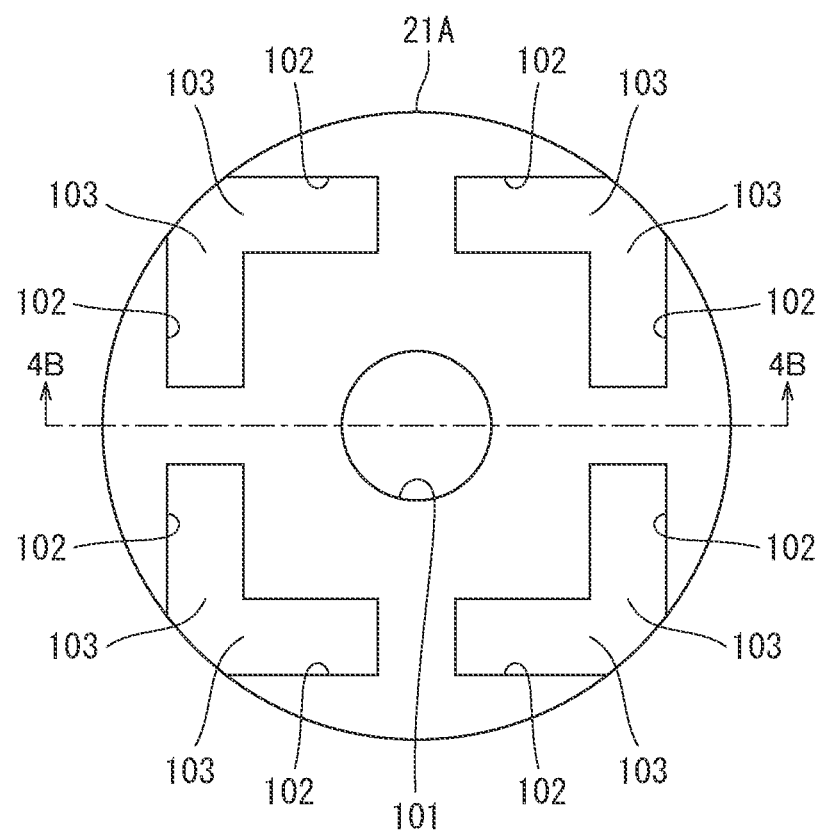
FIGS. 4A and 4B illustrate a state of processing the plate material illustrated in FIG. 3.
Figure 4B:
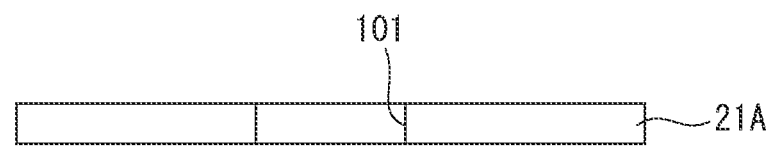

As illustrated in FIGS. 4A and 4B (FIGS. 4A and 4B illustrate only the plate material 21A), the rotor core forming step includes a step of forming a hole 101 to which the shaft 3 is fitted, holes 102 where the two magnet slots 23 are formed, holes 103 where the two communication passages 28 are formed on the respective plate materials 21A, 21B, 21C, and 21D (a plate material processing step).

The process of the respective plate materials 21A, 21B, 21C, and 21D in this plate material processing step can include, for example, a wire cutting in addition to punching by press.

Figure 5A:
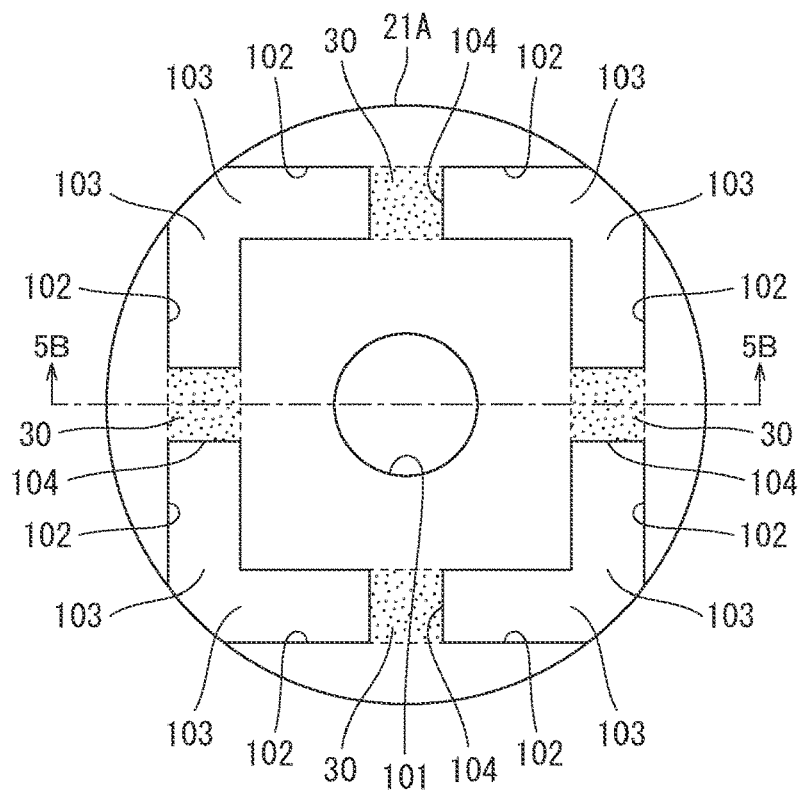
FIGS. 5A and 5B illustrate a state of performing non-magnetism on the plate material illustrated in FIG. 4.
Figure 5B:
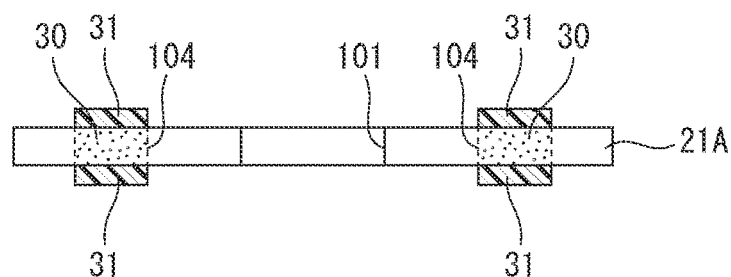

As illustrated in FIGS. 5A and 5B, the rotor core forming step includes a step of non-magnetizing a part or all (all in this embodiment) of parts 104 corresponding to the center bridges 26 of the plurality of respective plate materials 21A, 21B, 21C, and 21D and forming the non-magnetic portions 30 (a non-magnetizing step).

While laser irradiation is most preferable as the method of non-magnetism in this non-magnetizing step from the aspect of convenience or a similar feature, any method may be employed as long as the method can perform local heating and rapid cooling. The following describes the case of performing the laser irradiation. While the effects of the present invention can be obtained even the case of feeble magnetism in which magnetism partially remains after the laser irradiation, adjusting the laser irradiation period and performing the non-magnetism, which sufficiently dissipates the magnetism, are preferable.

The sites to be non-magnetized are a part or all of the parts 104 corresponding to the center bridges 26 of the respective plate materials 21A, 21B, 21C, and 21D. From the aspect of the magnetic flux leakage, configuring all of the parts 104 corresponding to the center bridges 26 of the respective plate materials 21A, 21B, 21C, and 21D to be the non-magnetic portions 30 is preferable. Meanwhile, as long as a magnetic reluctance can be sufficiently increased at the respective center bridges 26, the non-magnetism may be performed only a part of the parts 104 corresponding to the center bridges 26 of the respective plate materials 21A, 21B, 21C, and 21D. For the irradiation with laser, the site to be non-magnetized may be irradiated once or laser with a small spot may be scanned. While the rapid cooling after the laser irradiation may be air cooling, water cooling and oil cooling may be performed as necessary. To use of the silicon steel plate as the material of the plate materials 21A, 21B, 21C, and 21D of the rotor core 21 requires addition of a modified substance such as Cr and C for stabilization of a non-magnetic austenite phase. Specifically, it is only necessary to apply these substances on the surfaces of the plate materials and then perform laser irradiation. Note that, to penetrate the modified substance into the plate materials during the laser irradiation in this case, insulation coating is preferably not performed at least on the laser irradiation unit.

When a part or all of the parts 104 corresponding to the respective center bridges 26 of the plurality of plate materials 21A, 21B, 21C, and 21D are non-magnetized to form the non-magnetic portions 30, as illustrated in FIG. 5B, the oxide films 31 are formed on the front surfaces and the back surfaces of the non-magnetic portions 30. This is because, performing the non-magnetism through heating with laser causes the temperature of the laser irradiation unit to be about 1000 degrees; therefore, oxidation of the laser irradiation unit is unavoidable.

Figure 6:
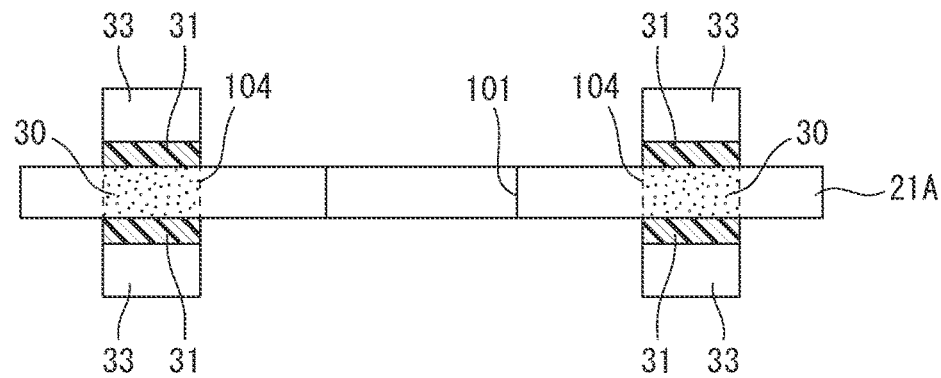
FIG. 6 is a cross-sectional view illustrating a state of installing hard masks to the plate material illustrated in FIG. 5.

As illustrated in FIGS. 6 to 8, in the rotor core forming step, the insulation films 32 are formed on the front surfaces and the back surfaces of the parts other than the regions where the non-magnetic portions 30 are formed on the plurality of respective plate materials 21A, 21B, 21C, and 21D (an insulation film forming step).

This insulation film forming step includes a hard mask installing step illustrated in FIG. 6, an application liquid applying and hardening step illustrated in FIG. 7, and a hard mask removing step illustrated in FIG. 8.

Here, as illustrated in FIG. 6, the hard mask installing step installs heat-resistant hard masks 33 on the front surfaces and the back surfaces of the regions where the non-magnetic portions 30 are formed on the plurality of respective plate materials 21A, 21B, 21C, and 21D. It is only necessary that the hard mask 33 has a shape by which the oxide film 31 formed at the non-magnetic portion 30 is covered, regardless of the shape being a ring shape and a multangular shape. For ease of positioning with a part on which the non-magnetizing process has been performed, a guide mechanism fitted to the magnet slot 23 may be disposed at the hard mask 33. Since the insulation films 32 are disposed at the front surfaces and the back surfaces other than the regions where the non-magnetic portions 30 are formed, the hard masks 33 are installed at the front surfaces and the back surfaces of the regions where the non-magnetic portions 30 are formed. Meanwhile, as described later, the hard masks 33 may be installed only on one surface in the case where the insulation films 32 are disposed on any one of the surfaces (one surface), the front surfaces and the back surfaces, except for the regions where the non-magnetic portions 30 are formed.

Thus, including the hard mask installing step allows continuously performing the application liquid applying and hardening step, facilitating automation of the step of forming the insulation films 32.

As illustrated in FIG. 7, the application liquid applying and hardening step applies application liquid to form the insulation films 32 over the front surfaces and the back surfaces of the respective plate materials 21A, 21B, 21C, and 21D and hardens the application liquid. Here, as the application liquid, Remisol EB 500F (manufactured by rembrandtin), a mixed material produced by mixing an organic material and an inorganic material, was used. Using a roll coater including opposed two rolls where application liquid is automatically supplied, the respective plate materials 21A, 21B, 21C, and 21D on which the hard masks 33 were installed on the front surfaces and the back surfaces are passed through between the two rolls and the application liquid is applied. Subsequently, the application liquid was cured at 200° C. for one minute to obtain the insulation films 32 adhering to the respective plate materials 21A, 21B, 21C, and 21D as illustrated in FIG. 7.

Next, as illustrated in FIG. 8, the hard mask removing step removes the respective hard masks 33. This forms the insulation films 32 on the front surfaces and the back surfaces of the parts other than the regions where the non-magnetic portions 30 are formed on the plurality of respective plate materials 21A, 21B, 21C, and 21D.

In the rotor core forming step, after forming the insulation films 32 on the front surfaces and the back surfaces of the parts other than the regions where the non-magnetic portions 30 are formed on the plurality of respective plate materials 21A, 21B, 21C, and 21D, the plurality of plate materials 21A, 21B, 21C, and 21D are laminated and fixed (a plate material laminating step).

In this plate material laminating step, the plurality of plate materials 21A, 21B, 21C, and 21D where the above-described insulation films 32 are formed are laminated and fixed such that the hole 101 to which the shaft 3 is fitted, the holes 102 where the two magnet slots 23 are formed, and the holes 103 forming the two communication passages 28 align in the laminating direction. The laminated plate materials can be mutually bound by caulking and welding. The rotor core 21 is thus manufactured.

The shaft fixing step performed after this step fixes the shaft 3 to the hole 101 of the rotor core 21 to which the shaft 3 is fitted. In this respect, the shaft 3 is fixed to the rotor core 21 by shrinkage fit. After the shaft 3 is fixed to the rotor core 21, the permanent magnets 27 are inserted into the respective magnet slots 23 and the permanent magnets 27 are fixed with adhesive. Then, the permanent magnets 27 are magnetized. The rotor 20 is thus manufactured. In the case where the already magnetized permanent magnets 27 are inserted into the respective magnet slots 23, magnetization after the insertion of the magnets is unnecessary.

Finally, when the rotor 20 is manufactured, the rotor core 21 is rotatably disposed at the inside of the stator core 11 via a bearing (not illustrated) (a rotor core disposing step). The permanent magnet type rotating electric machine 1 is thus manufactured.

Next, the following describes a problem in the permanent magnet type rotating electric machine according to a reference example illustrated in FIG. 9. In FIG. 9, like reference numerals designate identical members illustrated in FIGS. 1 to 8, and therefore such elements will not be further elaborated here in some cases.

While the permanent magnet type rotating electric machine illustrated in FIG. 9 has a basic configuration similar to the permanent magnet type rotating electric machine 1 according to the embodiment illustrated in FIGS. 1 to 8, the permanent magnet type rotating electric machine is different from the permanent magnet type rotating electric machine 1 according to the embodiment illustrated in FIGS. 1 to 8 in that the insulation films 32 are not formed at the front surfaces and the back surfaces of the parts other than the regions where the non-magnetic portions 30 are formed on the plurality of respective plate materials 21A, 21B, 21C, and 21D.

With the permanent magnet type rotating electric machine illustrated in FIG. 9, while the oxide films 31 are formed at the front surfaces and the back surfaces of the non-magnetic portions 30, the insulation films 32 are not formed at the front surfaces and the back surfaces of the parts other than the regions where the non-magnetic portions 30 are formed on the respective plate materials 21A, 21B, 21C, and 21D. In view of this, the front surfaces and the back surfaces of the respective plate materials 21A, 21B, 21C, and 21D to form the rotor core 21 are not flat, and the plate thicknesses of the respective plate materials 21A, 21B, 21C, and 21D are not uniform. In view of this, laminating these plate materials 21A, 21B, 21C, and 21D to form the rotor core 21 warps the laminated materials and this makes it difficult to embed the permanent magnets 27 into the respective magnet slots 23.

In contrast to this, with the permanent magnet type rotating electric machine 1 according to the embodiment illustrated in FIGS. 1 to 8, since the insulation films 32 are not formed at the front surfaces and the back surfaces of the parts other than the regions where the non-magnetic portions 30 are formed on the plurality of respective plate materials 21A, 21B, 21C, and 21D, the insulation films 32 are formed at the front surfaces and the back surfaces of the parts other than the regions where the non-magnetic portions 30 are formed on the plurality of respective plate materials 21A, 21B, 21C, and 21D. In view of this, the plate thicknesses of the plurality of respective plate materials 21A, 21B, 21C, and 21D forming the rotor core 21 become almost uniform. Even when the oxide films 31 are present on the front surfaces and the back surfaces of the non-magnetic portions 30 of the plurality of respective plate materials 21A, 21B, 21C, and 21D forming the rotor core 21, the plate materials 21A, 21B, 21C, and 21D can be laminated with the uniform plate thickness.

Figure 10:
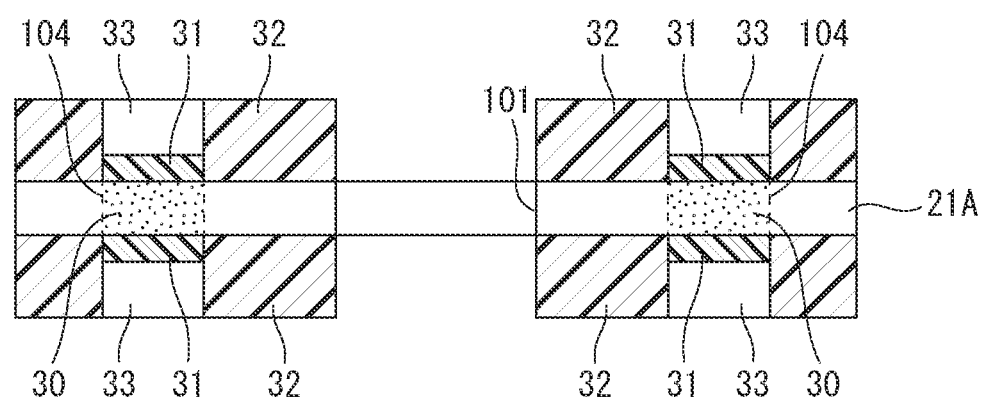
FIG. 10 is a cross-sectional view illustrating a modification of the permanent magnet type rotating electric machine illustrated in FIG. 1 where insulation films are formed on front surfaces and back surfaces of parts other than regions where non-magnetic portions are formed on a plurality of respective plate materials forming a rotor core and heat-resistant hard masks keeping flatness with the insulation films are installed at front surfaces and back surfaces of regions where the non-magnetic portions are formed on the plurality of respective plate materials.

FIG. 10 is a cross-sectional view illustrating a modification of the permanent magnet type rotating electric machine 1 illustrated in FIG. 1 where insulation films are formed on front surfaces and back surfaces of parts other than regions where non-magnetic portions are formed on a plurality of respective plate materials forming a rotor core and heat-resistant hard masks keeping flatness with the insulation films are installed at front surfaces and back surfaces of regions where the non-magnetic portions are formed on the plurality of respective plate materials.

That is, the insulation films 32 are formed at the front surfaces and the back surfaces of the parts other than the regions where the non-magnetic portions 30 are formed on the plurality of respective plate materials 21A, 21B, 21C, and 21D forming the rotor core 21. The heat-resistant hard masks 33 keeping flatness with the insulation films 32 are installed at the front surfaces and the back surfaces of the regions where the non-magnetic portions 30 are formed on the plurality of respective plate materials 21A, 21B, 21C, and 21D. The permanent magnet type rotating electric machine 1 may be one illustrated in FIG. 10.

To manufacture a modification of the permanent magnet type rotating electric machine 1 illustrated in FIG. 10, the insulation film forming step is provided similar to the above-described insulation film forming step. This insulation film forming step includes the hard mask installing step of disposing the heat-resistant hard masks 33 keeping flatness with the insulation films 32 on the surfaces of the regions where the non-magnetic portions 30 are formed on the plurality of respective plate materials 21A, 21B, 21C, and 21D and the application liquid applying and hardening step of applying the application liquid forming the insulation films 32 over the surfaces of the plurality of respective plate materials 21A, 21B, 21C, and 21D and hardening the application liquid. Note that, the hard mask removing step illustrated in FIG. 8 is omitted. That is, this modification is an example where the hard mask removing step may be omitted as long as the flatness of the respective plate materials 21A, 21B, 21C, and 21D is kept. In view of this, this modification can omit the hard mask removing step.

The plurality of respective plate materials 21A, 21B, 21C, and 21D thus formed are laminated and fixed similar to the method as described above. The rotor core 21 is thus formed.

In this modification as well, the plate thicknesses of the plurality of respective plate materials 21A, 21B, 21C, and 21D forming the rotor core 21 become almost uniform. This ensures laminating the plate materials 21A, 21B, 21C, and 21D with the uniform plate thickness even with the oxide films 31 on the front surfaces and the back surfaces of the non-magnetic portions 30 on the plurality of respective plate materials 21A, 21B, 21C, and 21D forming the rotor core 21.

While the embodiments of the present invention have been described above, the present invention is not limited to these embodiments and various modifications and improvements are possible.

For example, it is not necessary to form the insulation films 32 on both surfaces of the front surfaces and the back surfaces of the parts other than the regions where the non-magnetic portions 30 are formed on the plurality of respective plate materials 21A, 21B, 21C, and 21D, and the insulation films 32 may be formed only any one of the surfaces (one surface) of the front surfaces and the back surfaces of the parts other than these regions. Forming the insulation films 32 only on any one of the surfaces (one surface) of the front surfaces and the back surfaces of the parts other than these regions ensures shortening the length of the permanent magnet type rotating electric machine 1 in the shaft 3 extending direction.

Additionally, in the rotor core 21, it is unnecessary to form the two communication passages 28, which cause the two endmost respective magnet slots 23 (only the two magnet slots in this embodiment) to communicate with the outer peripheral surface 21a of the rotor core 21. That is, a so-called side bridge may be disposed. In this case, the side bridge may be non-magnetized or needs not to be non-magnetized. When the side bridge is not non-magnetized, the insulation film 32 is preferably formed at a front surface and a back surface of a part where the side bridge is formed.

Not only the case where the rotor core 21 includes the two magnet slots 23 in the one magnetic pole 22, but also the three or more magnet slots 23 may be disposed. In this case, the two or more center bridges 26 are formed between the adjacent magnet slots 23. In this case, the non-magnetic portions 30 are formed at a part or all of the two or more respective center bridges 26. The insulation films 32 are formed at the front surfaces and the back surfaces or any one of the surfaces of the front surfaces and the back surfaces of the parts other than the regions where the non-magnetic portions 30 are formed on the plurality of respective plate materials 21A, 21B, 21C, and 21D.

It is only necessary that the insulation film 32 is made of the organic material, the inorganic material, or the mixture of these materials, and therefore the insulation film 32 needs not to be made of the mixture of the organic material and the inorganic material.

The insulation film forming step needs not to include the hard mask installing step.

While this embodiment forms the rotor core 21 by laminating the four sheets of the plate materials 21A, 21B, 21C, and 21D, it is only necessary that the number of plate materials is plural and therefore is not limited to four sheets.

REFERENCE SIGNS LIST 1 permanent magnet type rotating electric machine,
2 frame,
3 shaft, 10 stator,
11 stator core,
13 teeth,
14 winding wire,
20 rotor,
21 rotor core,
21A, 21B, 21C, 21D plate material,
22 magnetic pole,
23 magnet slot,
24 outer peripheral edge,
25 core portion,
26 center bridge,
27 permanent magnet,
28 communication passage,
30 non-magnetic portion,
32 insulation film,
33 hard mask,
G gap

The invention claimed is:

1. A permanent magnet type rotating electric machine, comprising:
a stator that includes a stator core and a plurality of winding wires, the plurality of winding wires being wound around a plurality of respective teeth disposed at the stator core; and
a rotor rotatably disposed opposed to the stator core at a predetermined gap, wherein:
the rotor includes a rotor core, a plurality of permanent magnets, and a shaft, the rotor core being formed of a plurality of plate materials laminated together, the rotor core including a plurality of magnet slots, an outer peripheral edge, a core portion, and one or a plurality of center bridges in one magnetic pole, the outer peripheral edge being formed outside the plurality of magnet slots, the core portion being formed inside the plurality of magnet slots, the one or the plurality of center bridges being formed between adjacent magnet slots among the plurality of magnet slots to couple the outer peripheral edge and the core portion together, the plurality of permanent magnets being respectively disposed inside the plurality of magnet slots, the shaft being fixed to the rotor core,
at a part or all of the one or the plurality of center bridges, non-magnetic portions are formed,
insulation films are disposed on surfaces of parts other than regions where the non-magnetic portions are formed on the plurality of plate materials, and
heat-resistant hard masks are disposed on surfaces of the regions where the non-magnetic portions are formed on the plurality of plate materials, the hard masks being flat with the insulation films.

2. The permanent magnet type rotating electric machine according to claim 1, wherein
the insulation films are disposed on a front surface and a rear surface of each of the plurality of plate materials.

3. The permanent magnet type rotating electric machine according to claim 2, wherein
the insulation films are made of an organic material, an inorganic material, or a mixture of the organic material and the inorganic material.

4. The permanent magnet type rotating electric machine according to claim 2, wherein
the rotor core includes two communication passages in the one magnetic pole, the communication passages allowing two endmost magnet slots among the plurality of magnet slots to communicate with an outer peripheral surface of the rotor core.

5. The permanent magnet type rotating electric machine according to claim 2, wherein
the hard masks are disposed on a front surface and a rear surface of the surfaces of the regions where the non-magnetic portions are formed.

6. The permanent magnet type rotating electric machine according to claim 5, wherein
an oxide film is disposed between each of the hard masks and a respective non-magnetic portion among the non-magnetic portions.

7. The permanent magnet type rotating electric machine according to claim 1, wherein
the insulation films are made of an organic material, an inorganic material, or a mixture of the organic material and the inorganic material.

8. The permanent magnet type rotating electric machine according to claim 7, wherein
the rotor core includes two communication passages in the one magnetic pole, the communication passages allowing two endmost magnet slots among the plurality of magnet slots to communicate with an outer peripheral surface of the rotor core.

9. The permanent magnet type rotating electric machine according to claim 1, wherein
the rotor core includes two communication passages in the one magnetic pole, the communication passages allowing two endmost magnet slots among the plurality of magnet slots to communicate with an outer peripheral surface of the rotor core.

10. The permanent magnet type rotating electric machine according to claim 1, wherein
the insulation films are disposed on at least one of a front surface or a rear surface of each of the plurality of plate materials.

11. The permanent magnet type rotating electric machine according to claim 10, wherein
a hard mask among the hard masks is disposed on a front surface of the surfaces of the regions where the non-magnetic portions are formed when the insulation films are disposed on the front surface of a plate material among the plurality of plate materials, and
a hard mask among the hard masks is disposed on a rear surface of the surfaces of the regions where the non-magnetic portions are formed when the insulation films are disposed on the rear surface of a plate material among the plurality of plate materials.

12. The permanent magnet type rotating electric machine according to claim 11, wherein
an oxide film is disposed between each of the hard masks and a respective non-magnetic portion among the non-magnetic portions.

13. The permanent magnet type rotating electric machine according to claim 1, wherein
an oxide film is disposed between each of the hard masks and a respective non-magnetic portion among the non-magnetic portions.

14. A permanent magnet type rotating electric machine, comprising:
a stator that includes a stator core and a plurality of winding wires, the plurality of winding wires being wound around a plurality of respective teeth disposed at the stator core; and
a rotor rotatably disposed opposed to the stator core, wherein:
the rotor includes a rotor core and a plurality of permanent magnets, the rotor core being formed of a plurality of plate materials laminated together, the rotor core including a plurality of magnet slots, an outer peripheral edge, a core portion, and one or more center bridges in a magnetic pole, the one or more center bridges being disposed between adjacent magnet slots among the plurality of magnet slots to couple the outer peripheral edge and the core portion together, wherein at least one plate material among the plurality of plate materials includes:
  a center bridge among the one or more center bridges,
  a non-magnetic portion disposed at the center bridge,
  an insulation film disposed on the at least one plate material at a region other than a region where the non-magnetic portion is formed, and
  a heat-resistant hard mask disposed on a surface of the region where the non-magnetic portion is formed such that an outer surface of the hard mask which faces away from the non-magnetic portion is flush with an outer surface of the insulation film which faces away from the at least one plate material.

15. A manufacturing method of a permanent magnet type rotating electric machine, the method comprising:
  forming a stator by:
    forming a stator core and
    winding a plurality of winding wires around a plurality of respective teeth disposed at the stator core to form a stator; and
  forming a rotor to be rotatably disposed opposed to the stator core at a predetermined gap, by:
    forming a rotor core by laminating a plurality of plate materials, the rotor core including a plurality of magnet slots, an outer peripheral edge, a core portion, and one or a plurality of center bridges in one magnetic pole, the outer peripheral edge being formed outside the plurality of magnet slots, the core portion being formed inside the plurality of magnet slots, the one or the plurality of center bridges being formed between adjacent magnet slots among the plurality of magnet slots to couple the outer peripheral edge and the core portion together,
    fixing a shaft to the rotor core,
    respectively inserting a plurality of permanent magnets inside the plurality of magnet slots, and
    rotatably disposing the rotor core at an inner peripheral side of the stator core, wherein the forming the rotor core includes:
      preparing the plurality of plate materials,
      forming a hole to which the shaft is fitted, on the plurality of plate materials,
      forming holes to form the plurality of magnet slots, on the plurality of plate materials,
      non-magnetizing a part or all of parts corresponding to the center bridges of the plurality of plate materials to form non-magnetic portions,
      forming insulation films on surfaces of parts other than regions where the non-magnetic portions are formed on the plurality of plate materials, and
      laminating and fixing the plurality of plate materials such that the hole to which the shaft is fitted and the holes forming the plurality of magnet slots are aligned in a laminating direction,
    wherein the forming the insulation films includes:
      disposing heat-resistant hard masks on surfaces of the regions where the non-magnetic portions are formed on the plurality of plate materials, the hard masks being flat with the insulation films, and
      applying application liquid forming the insulation films over surfaces of the plurality of plate materials and hardening the application liquid.

\* \* \* \* \*